United States Patent
Borysewicz et al.

(10) Patent No.: US 6,732,332 B1
(45) Date of Patent: May 4, 2004

(54) AUTOMATED WEB SITE CREATION SYSTEM

(75) Inventors: Henry Borysewicz, Grand Forks, ND (US); David K. Horne, Fargo, ND (US); Joseph Paul Stevens, Grand Forks, ND (US)

(73) Assignee: UND Aerospace Foundation, Grand Forks, ND (US)

( * ) Notice: Subject to any disclaimer, the term of this patent is extended or adjusted under 35 U.S.C. 154(b) by 142 days.

(21) Appl. No.: 09/694,224

(22) Filed: Oct. 23, 2000

Related U.S. Application Data

(60) Provisional application No. 60/228,548, filed on Aug. 28, 2000.

(51) Int. Cl.[7] .............................................. G06F 17/21
(52) U.S. Cl. ...................... 715/513; 709/219; 707/102
(58) Field of Search .................................. 707/513, 530, 707/10, 102, 501.1; 709/203, 217–219; 345/760, 853–854; 715/501.1, 513, 530

(56) References Cited

U.S. PATENT DOCUMENTS

| | | | | |
|---|---|---|---|---|
| 4,751,740 A | | 6/1988 | Wright ........................ 382/180 |
| 5,608,874 A | | 3/1997 | Ogawa et al. .............. 707/201 |
| 5,745,360 A | | 4/1998 | Leone et al. ................... 706/50 |
| 5,819,302 A | | 10/1998 | Nielsen ....................... 707/512 |
| 5,845,283 A | | 12/1998 | Williams et al. ............... 707/1 |
| 5,907,598 A | | 5/1999 | Mandalia et al. ........... 358/407 |
| 5,937,160 A | * | 8/1999 | Davis et al. .................. 707/10 |
| 5,963,966 A | | 10/1999 | Mitchell et al. ............. 707/513 |
| 5,968,125 A | * | 10/1999 | Garrick et al. ........... 707/501.1 |
| 6,003,032 A | * | 12/1999 | Bunney et al. ................ 707/10 |
| 6,032,147 A | | 2/2000 | Williams et al. ................ 707/1 |
| 6,061,696 A | | 5/2000 | Lee et al. .................... 707/513 |
| 6,064,977 A | * | 5/2000 | Haverstock et al. ........ 345/963 |
| 6,115,723 A | | 9/2000 | Fallside ...................... 707/513 |
| 6,163,878 A | * | 12/2000 | Kohl ............................. 707/1 |
| 6,189,018 B1 | * | 2/2001 | Newman et al. ............ 345/841 |
| 6,192,415 B1 | | 2/2001 | Haverstock et al. ........ 707/513 |
| 6,226,648 B1 | * | 5/2001 | Appleman et al. .......... 707/102 |
| 6,233,591 B1 | * | 5/2001 | Sherman et al. ............ 345/700 |
| 6,256,631 B1 | * | 7/2001 | Malcolm ..................... 707/10 |
| 6,292,894 B1 | * | 9/2001 | Chipman et al. ............ 713/168 |
| 6,301,621 B1 | | 10/2001 | Haverstock et al. ........ 345/963 |
| 6,308,188 B1 | * | 10/2001 | Bernardo et al. ........ 707/501.1 |
| 6,313,835 B1 | * | 11/2001 | Gever et al. ................. 345/629 |
| 6,314,425 B1 | * | 11/2001 | Serbinis et al. .............. 705/26 |
| 6,356,903 B1 | * | 3/2002 | Baxter et al. ................. 707/10 |
| 6,401,131 B1 | | 6/2002 | Haverstock et al. ........ 709/202 |
| 6,484,149 B1 | * | 11/2002 | Jammes et al. ............... 705/26 |
| 2001/0047362 A1 | * | 11/2001 | Comroe ................... 707/104.1 |
| 2003/0101238 A1 | * | 5/2003 | Davison ..................... 709/219 |

\* cited by examiner

*Primary Examiner*—Joseph H. Feild
(74) *Attorney, Agent, or Firm*—Schwegman, Lundberg, Woessner & Kluth, P.A.

(57) ABSTRACT

The present invention provides a system of creating Internet web content. In some embodiments, non-web content is received in a web content creation module, which automatically creates web content from the non-web content. In select further embodiments, an organizational database is then updated with information comprising web content structure information associated with the created web content, incorporating the web content into the web page.

32 Claims, 11 Drawing Sheets

AUTOMATED WEB SITE CREATION SYSTEM

This application claims the benefit of Provisional application Ser. No. 60/228,548, filed Aug. 28, 2000.

FIELD OF THE INVENTION

The invention relates generally to creation of Internet web pages, and more specifically to an automated system for creating web pages from other types of data.

BACKGROUND

As personal computer use and access to the Internet have become increasingly common, computers have become more widely relied upon for communication. The Internet, and the World Wide Web in particular, operate around the clock and allow nearly instantaneous worldwide distribution of information. Businesses provide product information, customer support, and ordering capability via the Internet; e-mail is widely used for personal and business communication via the Internet in place of telephone or postal mail; and discussions relating to a wide variety of specific topics are conducted in Internet-based discussion groups. As technology and access to the Internet continue to increase, it is reasonable to expect that communication via the Internet will continue to increase in popularity and the methods in which the Internet is used to communicate will continue to expand.

Web pages or websites comprising a part of the World Wide Web (WWW) are perhaps the most common means of posting information for mass viewing or for providing services such as e-commerce ability to the public at large. Web pages are defined via a markup language that can be transmitted via the Internet or other network to website users. These users execute web browser applications that interpret the markup language information and render web pages on the user computer systems. Markup languages such as HTML allow presentation of text, graphics, menus, tables, and other useful structures to users via the network connections that link web page servers and user client systems running web browser applications. Furthermore, because a web page is typically reloaded each time a user views the page, distributing updated data via a web page requires only that a single copy of the web page stored on a server be updated. Creating or updating a web page does not require physical access to the server, but can be done from any other Internet-connected computer in the world.

Creating web pages originally consisted of hand-coding the markup language information that defined the web page, much like hand-writing a computer program using a computer language. Because this required knowledge of the markup language and careful attention to syntax and structure, and because use of a language to create a visual display is not particularly intuitive for most people, graphical markup language editors have become a common tool. These tools allow manipulation of elements of a web page in a manner that resembles current word processing applications, using a methodology known as what-you-see-is-what-you-get (WYSIWYG). This allows a web page designer to manipulate web page elements as the web page rendering is viewed, somewhat simplifying design.

In organizations with a large base of users wishing to publish content to the same web site, even tools such as graphical markup language editors may not be efficient enough for a web master to maintain such a large website alone. Multiple webmasters can be employed to handle different aspects of website management in such a large system. This requires not only employing more people, but also coordinating management and design of the larger website. A need was felt for tools that would enable users to update web page content directly without requiring knowledge of markup language coding, graphic web page design tools, or coordination of desired updates with one or more web site designers.

One solution involves the use of common gateway interface (CGI) scripts, which enable a user to enter information into a web page text field and pass the data onto Perl or C programs that can then convert the entered information into an HTML markup language file. However, this tends to produce simplistic web pages that have very little flexibility in formatting or different types of content. Changing the content or functionality of such as system typically requires rewriting the underlying program code, which is a time-consuming and difficult task.

What is desired is a system facilitating web site creation for users who do not know or desire to learn a suitable markup language or graphic web page design tools, and that allows both flexibility in structure and design and self-management of a user's web content.

SUMMARY OF THE INVENTION

The present invention provides a system of creating Internet web content. In some embodiments, non-web content is received in a web content creation module, which automatically creates web content from the non-web content. In select further embodiments, an organizational database is then updated with information comprising web content structure information associated with the created web content, incorporating the web content into the web site.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention provides in various embodiments a system facilitating web site creation for users who do not know or desire to learn a suitable markup language or graphic web page design tool. The system allows flexibility in structure and design, and allows self-management of the user's web content. In some embodiments, non-web content is received in a web content creation module, which automatically creates web content from the non-web content. In select further embodiments, an organizational database is then updated with information comprising web content structure information associated with the created web content, incorporating the web content into the web site.

Figure 1:
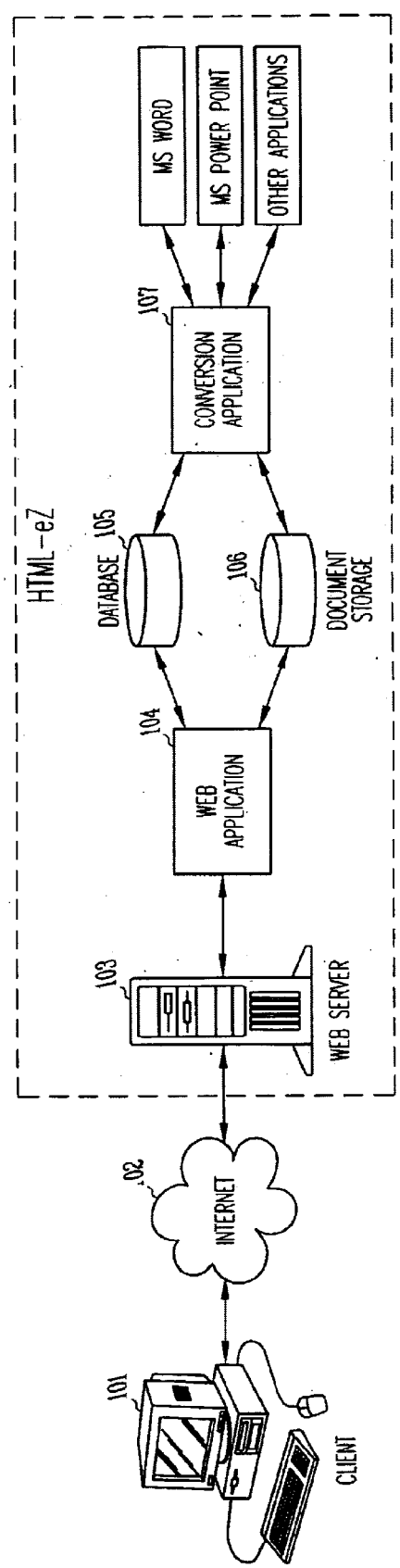
FIG. 1 shows a computerized system as may be used to practice certain embodiments of the present invention.

FIG. 1 illustrates a computerized system as may be used to practice some embodiments of the present invention. A user's client computer system 101 is connected via the Internet 102 or another suitable network to a web server 103. Executing on the web server 103 is a web application 104 that enables the web server system 103 to serve Internet web content to and receive data from client computers such as client computer 101. Also executing on the web server 103 or a system operatively connected thereto is a database 105 and a document storage facility 106. Server 103 or another computerized system operatively connected to the server also executes one or more conversion applications which are operable to convert non-web content to web content. For example, FIG. 1 illustrates at 107 conversion applications facilitating conversion from non-web content including Microsoft Word™ files, Microsoft PowerPoint™ files, and other applications.

The invention utilizes in some embodiments an organizational database, which records data records regarding the web pages comprising a part of a web site. The web site may be populated with web content via data collection web pages within a web-based website creation tool, may be collected by converting non-web content to web content and creating an associated record within the organizational database, or may otherwise be provided to a tool that receives and stores web content and stores its place within the structure of a website in an organizational database.

One embodiment of such a system will utilize a series of menus, such that the hierarchal structure of web pages and other content as stored in the database is reflected in a menu which a visitor to the website uses for navigation. The organizational database contains records for each page, including links between web site pages, which are used in rendering the website to create the menus. Some embodiments of the invention will also provide a web-based facility to create the initial structure of a new website, and to allow customization of the structure and content within the website by receiving such data and storing the desired structural information in the organizational database. The organizational database of some such embodiments will further contain data relating to the particular look or theme of each web page.

The example embodiment of the invention described below is one application of the invention to an educational context, where the invention facilitates creation of web sites for individual classes or class sections. This example known as HTML-eZ is used to describe how various aspects of the invention may operate and are interrelated, and how the invention may be implemented in a relatively user-friendly manner that requires little documentation or training.

Figure 2A:
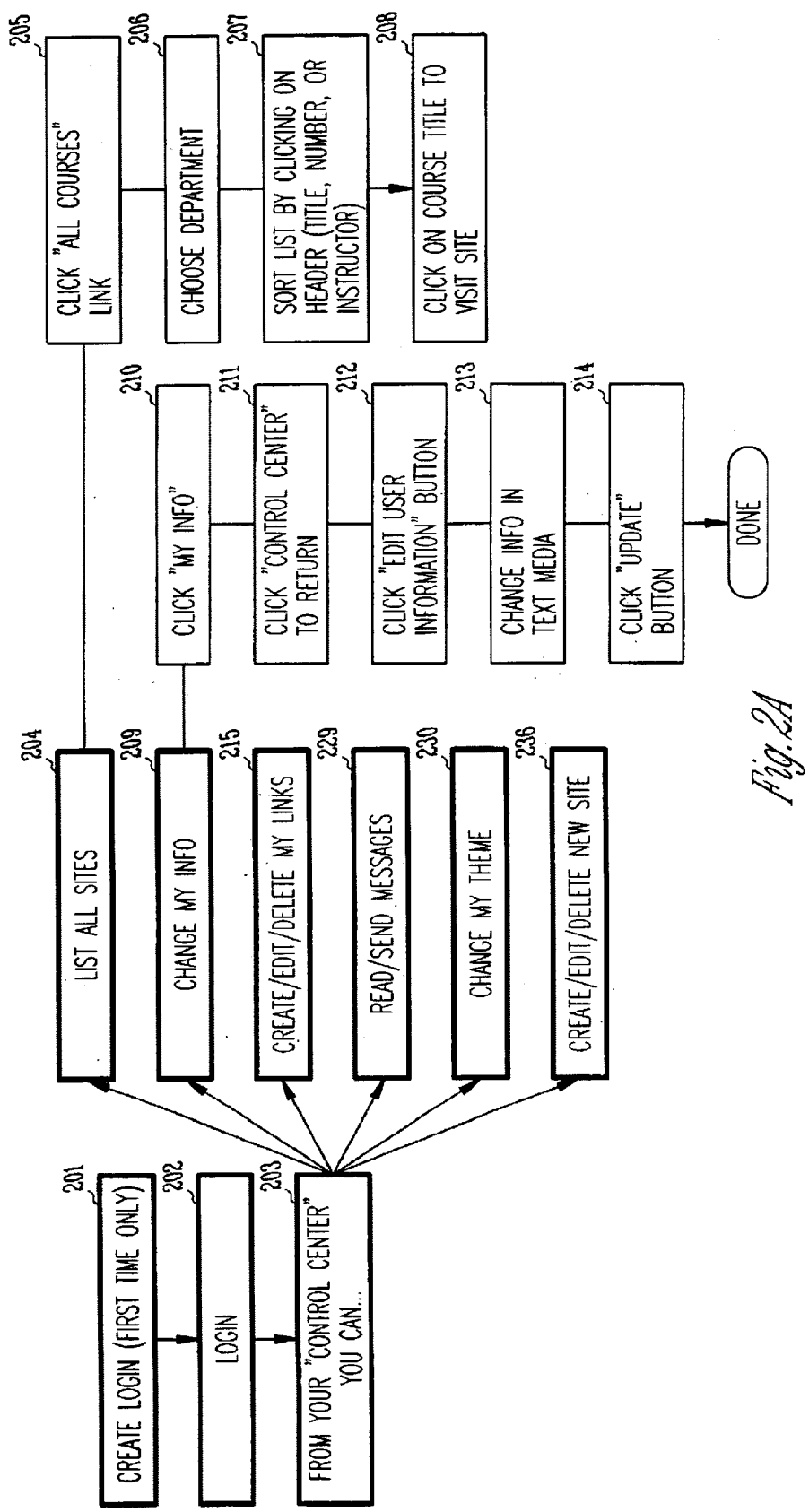
FIG. 2 is a diagram illustrating the menu structure of the HTML-eZ application, which is an example embodiment of the present invention.
Figure 2B:
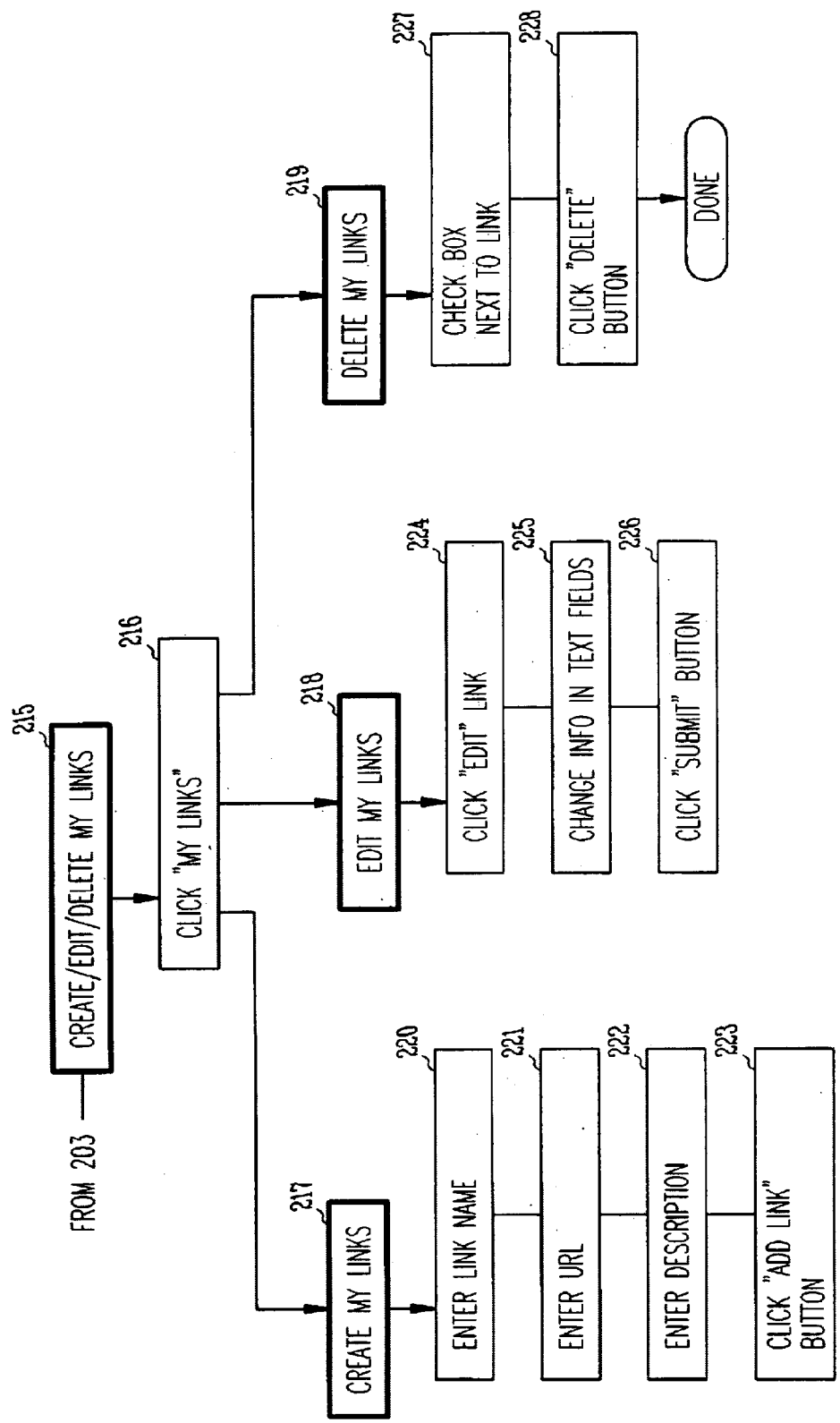
Figure 2C:
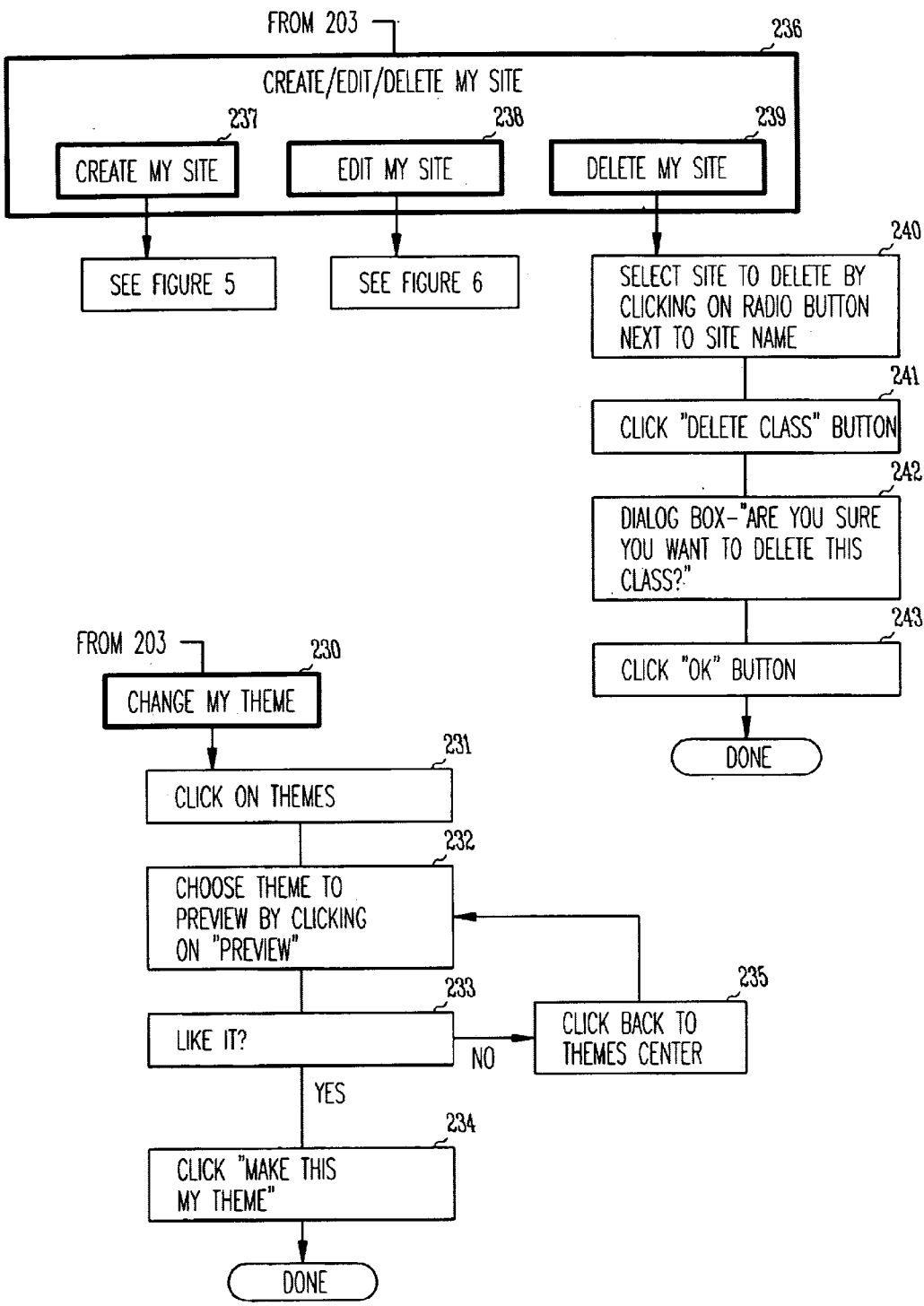

FIG. 2 is a flowchart that illustrates operation of the selected educational example embodiment of the present invention. At 201, a login is created for a new user of the system. The user then logs in at 202, and is presented with a control center menu presentation at 203. The user then typically selects from among the control center options. The options presented typically will vary by user, for example restricting students in this example from having the option to create a new site while allowing instructors to create sites, and allowing instructors to modify only sites they have created.

If the user selects "list all sites" at 204, the user is presented with a list of all sites on the web server. The user then may select to view all courses at 205, which results in displaying a listing providing a link to all courses in an educational institution having associated web sites in the system. The user may choose a specific department at 206 to access web sites from a specific department, and may further sort the listing by selected criteria at 207. The user may select and visit a site by clicking on the course title at 208.

If the user selects to "change my info" at 203, the user may select "my info" to access his information at 210. The user can edit information by selecting the "edit user information" button at 212, and can then change information at 213 and save the changes as updates at 214. Changes made are then stored as updates to the organizational database. The user may select "control center" at 211 to return to the control center 203.

The user may select to create, edit, or delete links within his web site from the control center menu at 215, at which point the user selects "my links" at 216 and whether to create a link at 217, edit a link at 218, or delete a link at 219. To create a link as shown at 217, the user enters the link name at 220, enters the uniform resource locator (URL) for the link at 221, enters a link description at 222, and clicks the "add link" button at 223.

To edit a link at 218, the user similarly clicks "edit link" at 224, changes info in the text fields associated with the link at 225, and clicks the "submit" button at 226 to submit the edits made to the link. To delete a link at 219, the user simply checks a box next to the link to be deleted at 227, and clicks the "delete" button at 228.

If the user chooses from the control center at 203 to read or send messages at 229, the user is brought to a message board or e-mail program facilitating communication between users. Example embodiments of such systems are described in greater detail later.

To change web page themes at 230, the "change my theme" button is selected from the control center at 203. Each theme defines a particular look for a web page by specifying colors, fonts, or other similar characteristics that are used in the visual rendering of the web page. After a theme is selected at 231, the user can choose to preview the theme by clicking on "preview" at 232. If the user likes the theme at 233, the user can select to "make this my theme" at 234. If the user does not like the previewed theme, the user can click back to the theme center selection and preview center at 235.

Finally, if the user selects from the control center at 203 to create, edit or delete a site, the user does so at 236. Creation of a site at 237 is explained in detail in discussion corresponding to FIG. 5, and editing a site at 238 is explained in detail in FIG. 6 and related discussion. To delete a site at 239, the user selects a site to delete using radio buttons presented next to site names at 240. The user then clicks the "delete class" button at 241 to delete the site relating to a specific class, and confirms the selection at 243 after receiving a confirmation notice at 242.

Figure 3A:
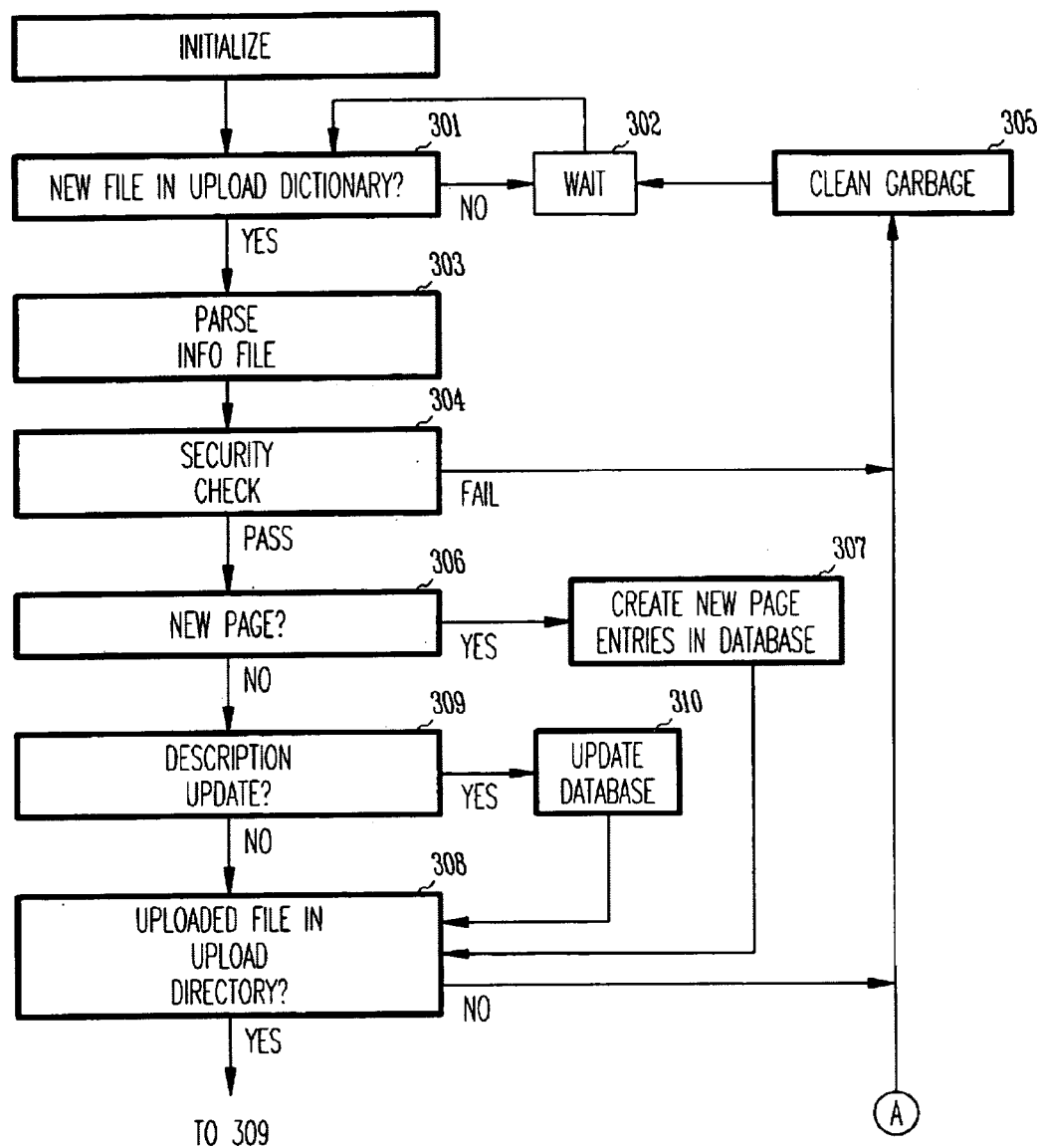
FIG. 3 is a diagram illustrating the operation of the conversion portion of the HTML-eZ example embodiment of the present invention.
Figure 3B:
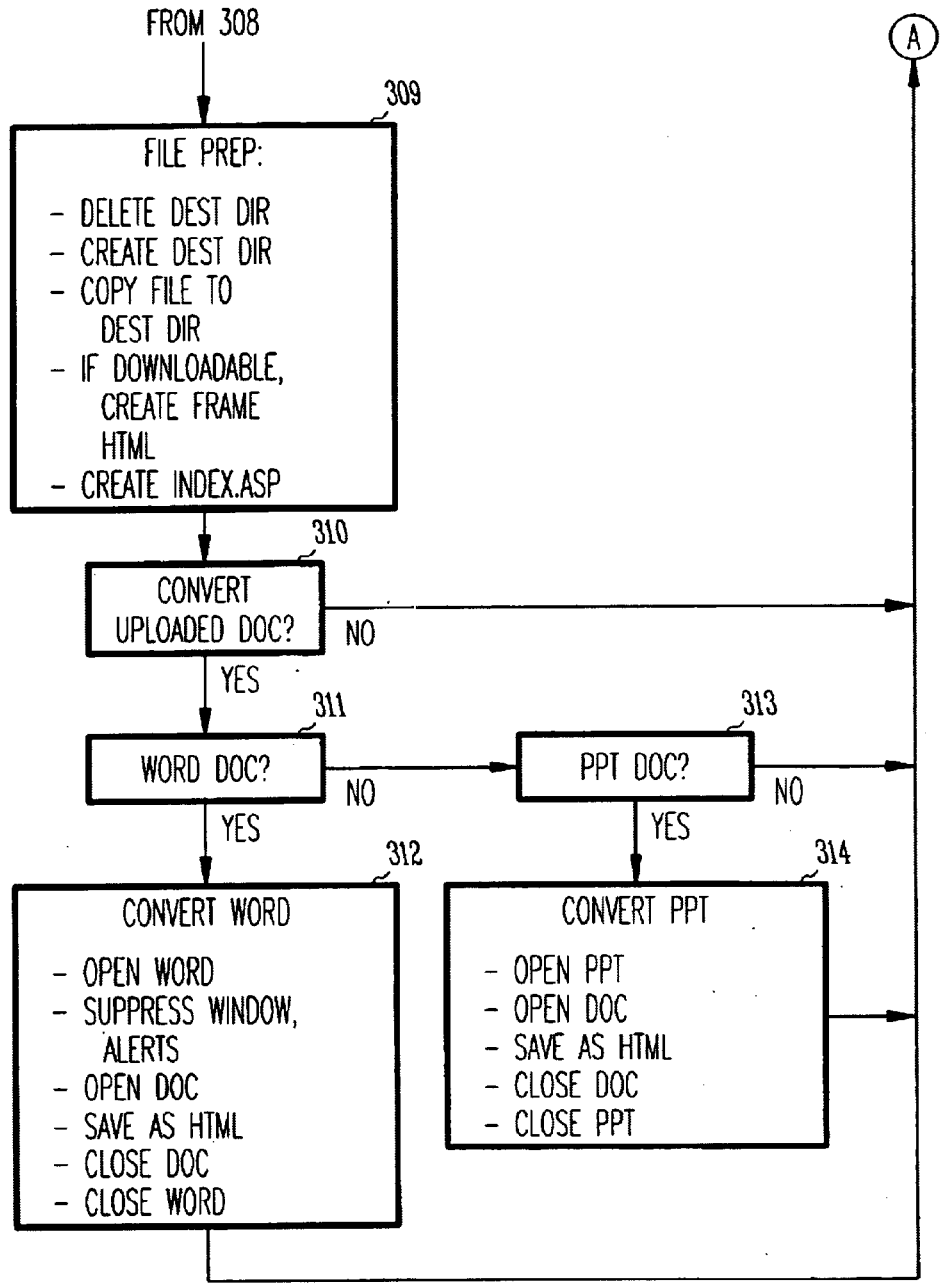

As shown at 107 of FIG. 1, the invention may incorporate various conversion applications to convert non-web content to web content to be linked to a web site created as described in FIG. 2. Non-web content is content that is not directly presentable via the Internet, including content that is not formatted or stored in a suitable markup language for display on a web browser. Such content is converted as is described in more detail in FIG. 3 to web content by converting the non-web content into content formatted in or stored in a markup language. As examples, FIG. 1 shows conversion of Microsoft Word™, Microsoft PowerPoint™, and other application-specific data to web content via the conversion application 107.

At 301, the conversion application searches for new content in a specific location such as in a certain directory. New content will be present in the specific location if a user has uploaded new data comprising update information for a web site or page. If no new content is found, the conversion application waits for a period of time at 302 and later checks again at 301. If new content is found at 301, information provided with the new content is parsed at 303 and a security check is performed at 304. The security check determines whether the user submitting the new file or files has proper authorization to change the content indicated in the new file or files. If the user doesn't have permission, the files are cleaned out at 305, and the system begins looking for new files at 301 after a brief pause at 302.

If the security check is passed, the parsed information is evaluated to determine whether a new page is to be created at 306. If a new page is to be created, the appropriate entries for the new page are created in the organizational database at 307. If the new file detected at 301 is determined at 309 not to be a new page but simply a description update for a currently existing page, the database is updated to reflect the update at 310. After the new page is created or the description is updated if necessary, files associated with the new page or description update are searched for in the specific location that is searched for new files.

If associated files are not found, the system continues to periodically monitor for other new files at 302 and 301. Otherwise, the associated file or files are prepared at 309 by cleaning out the old page and creating a new page from the associated file. If the associated file is determined at 310 to be a non-web document that must be converted to web content before it can be displayed on a web site, the document is compared against the types of document which the system recognizes and can convert, such as are shown at 107 of FIG. 1. For example, if the non-web content is recognized as a Microsoft Word™ document at 311 it is converted to web content at 312, and if the non-web content is recognized as a Microsoft PowerPoint™ document at 313 it is similarly converted at 314.

After these functions have completed, the conversion application cleans garbage files that are no longer needed at 305 and resumes periodic scanning for new files at 301 and 302.

Figure 4:
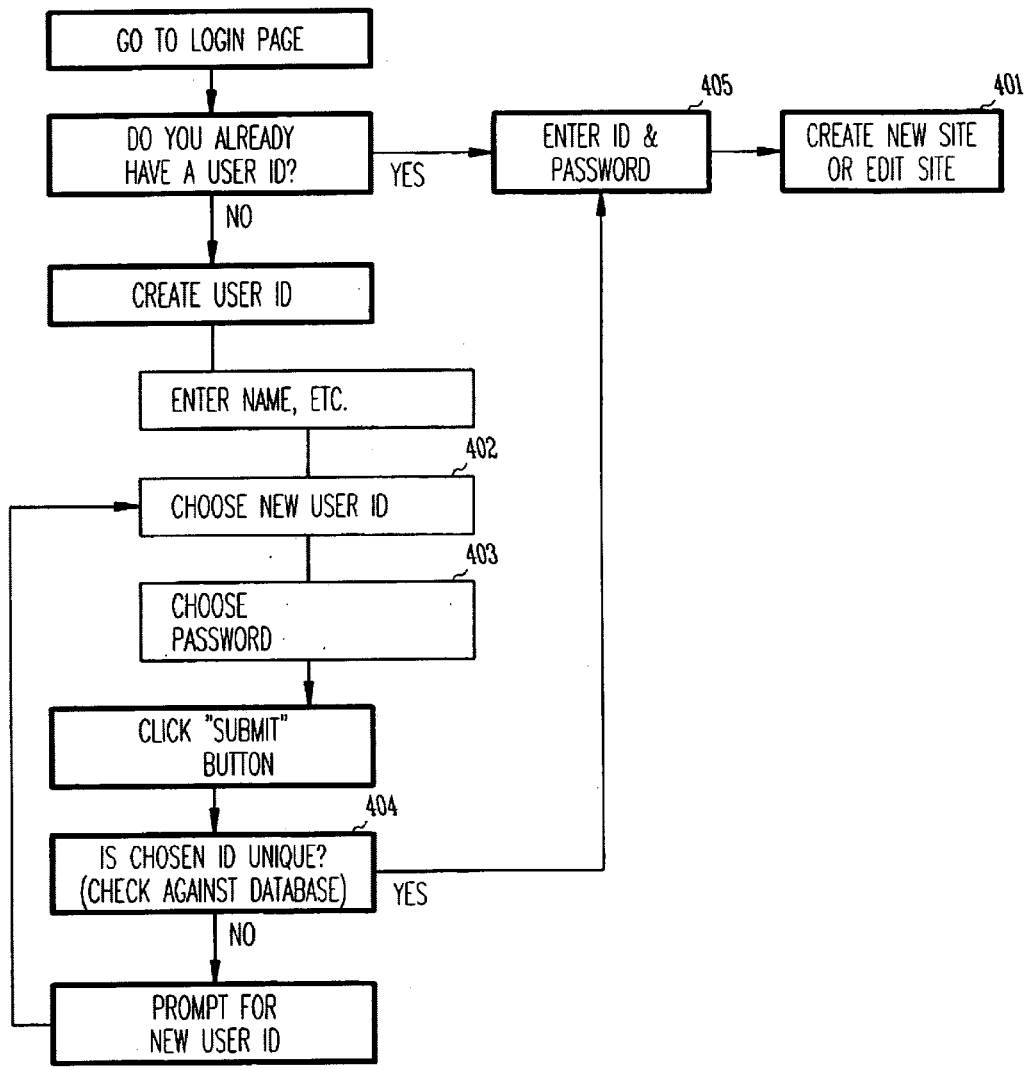
FIG. 4 is a diagram illustrating the login sequence followed by users of the HTML-eZ example embodiment of the present invention.

FIG. 4 illustrates generally at 400 the process for logging into one example embodiment of the invention, and illustrates that creation of a new site or editing a site at 401 as previously described occurs only after the process of choosing a user ID at 402 and selecting a password at 403 that are determined unique at 404, and properly logging in at 405. This ensures the integrity of the web content created by preventing unauthorized alteration to a web site.

Figure 5:
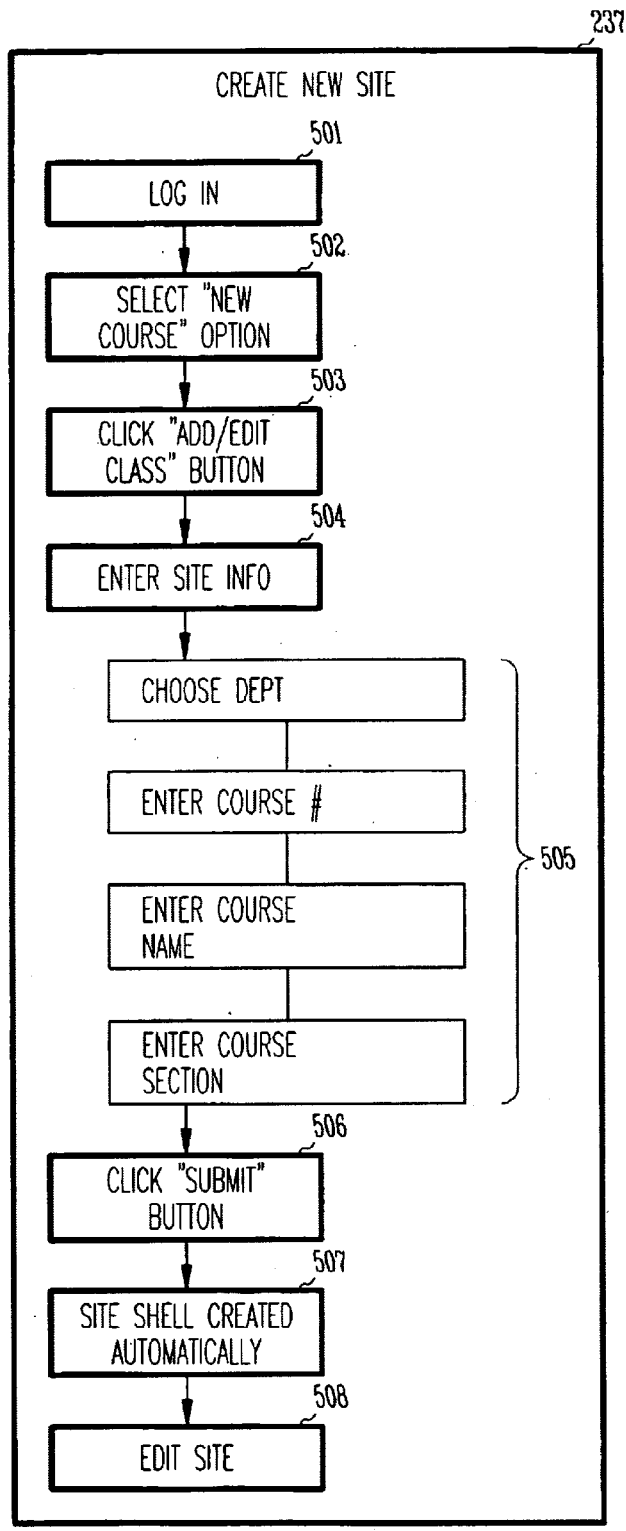
FIG. 5 is a diagram that illustrates in greater detail the creation of a new web site with the HTML-eZ example embodiment of the present invention.
Figure 6A:
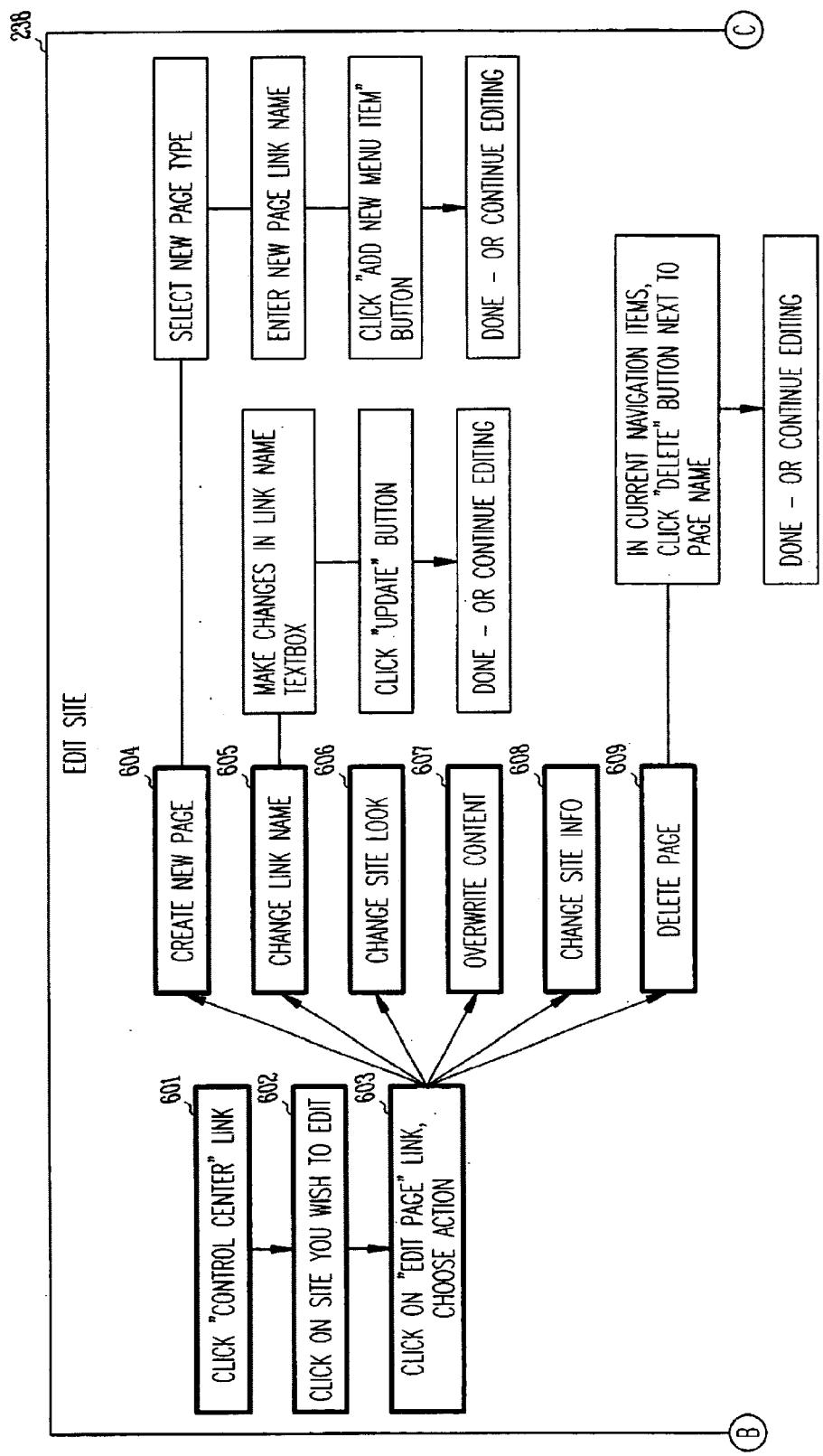
FIG. 6 is a diagram that illustrates in greater detail editing of a web site with the HTML-eZ example embodiment of the present invention.
Figure 6B:
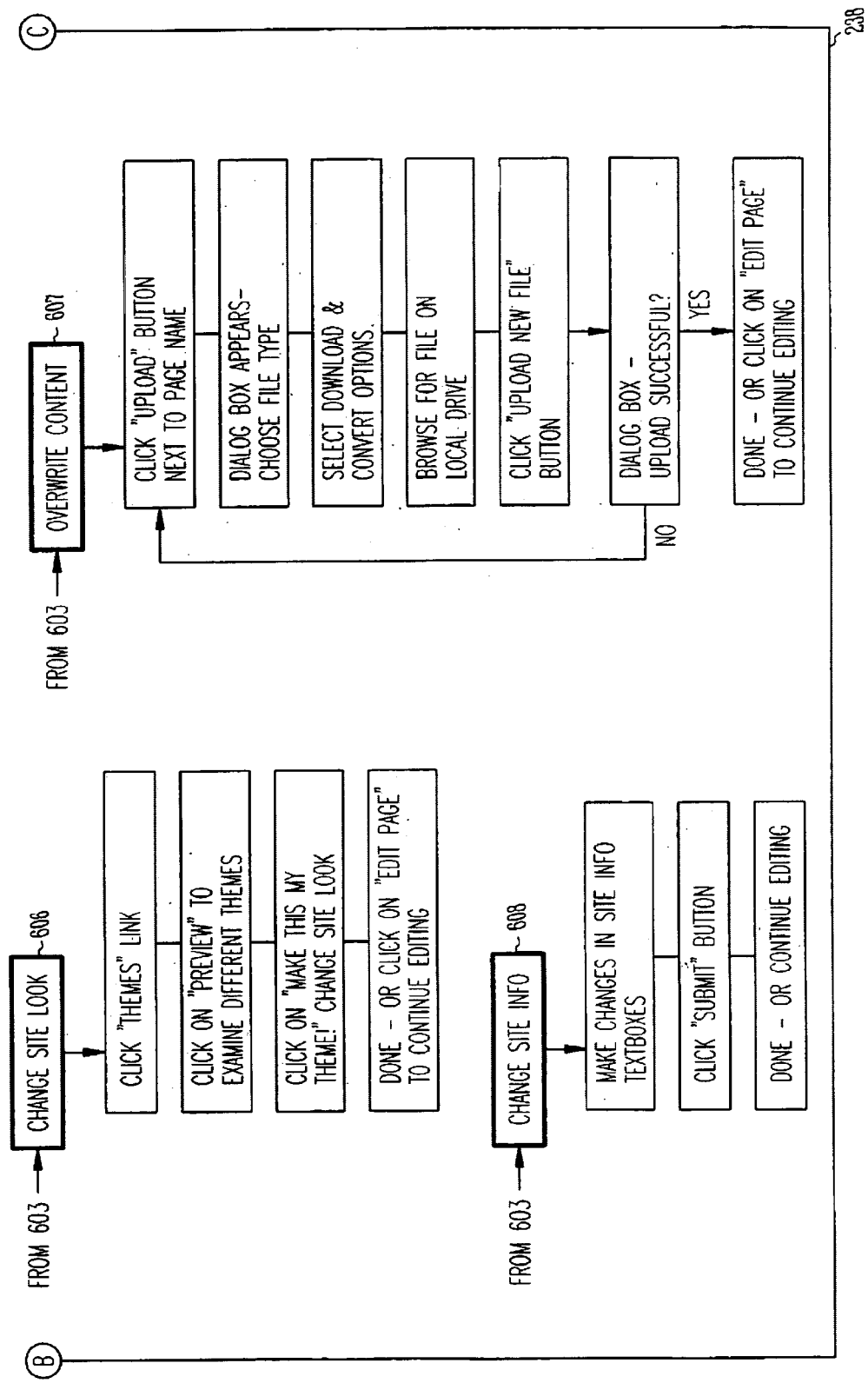

Creation of a new site is illustrated in FIG. 5. The process starts with logging in at 501, as described at FIG. 4. Some embodiments of the invention will allow only certain users to create or edit sites, and may otherwise restrict the ability of various users to modify web content. Once logged in, the user proceeds to the "create my site" option at 237 of FIG. 2, and selects "new course" at 502. The user then selects "add/edit class" at 503, and enters site information as prompted at 504. This information may include department, course number, course name, course section, or other information identifying the site as shown at 505. The user submits the information at 506, and a shell site is automatically created at 507. The user then will typically proceed to edit the shell site at 508, to provide customized site content.

Editing a site begins by logging in and following FIG. 2 to 238, where the user has selected to edit a site. From the control center at 203 (corresponding to 601 of FIG. 6), the user may also select a site at 602 and click on an "edit page" link at 603 once a site is selected to edit a selected site. From the "edit page" link, the user has the choices of creating a new page at 604, changing a linked page name at 605, changing a site's look or appearance scheme at 606, overwriting previous content by uploading a new file at 607, changing site information at 608 such as was originally entered at 505 of FIG. 5, or deleting an existing page at 609.

Figure 7:
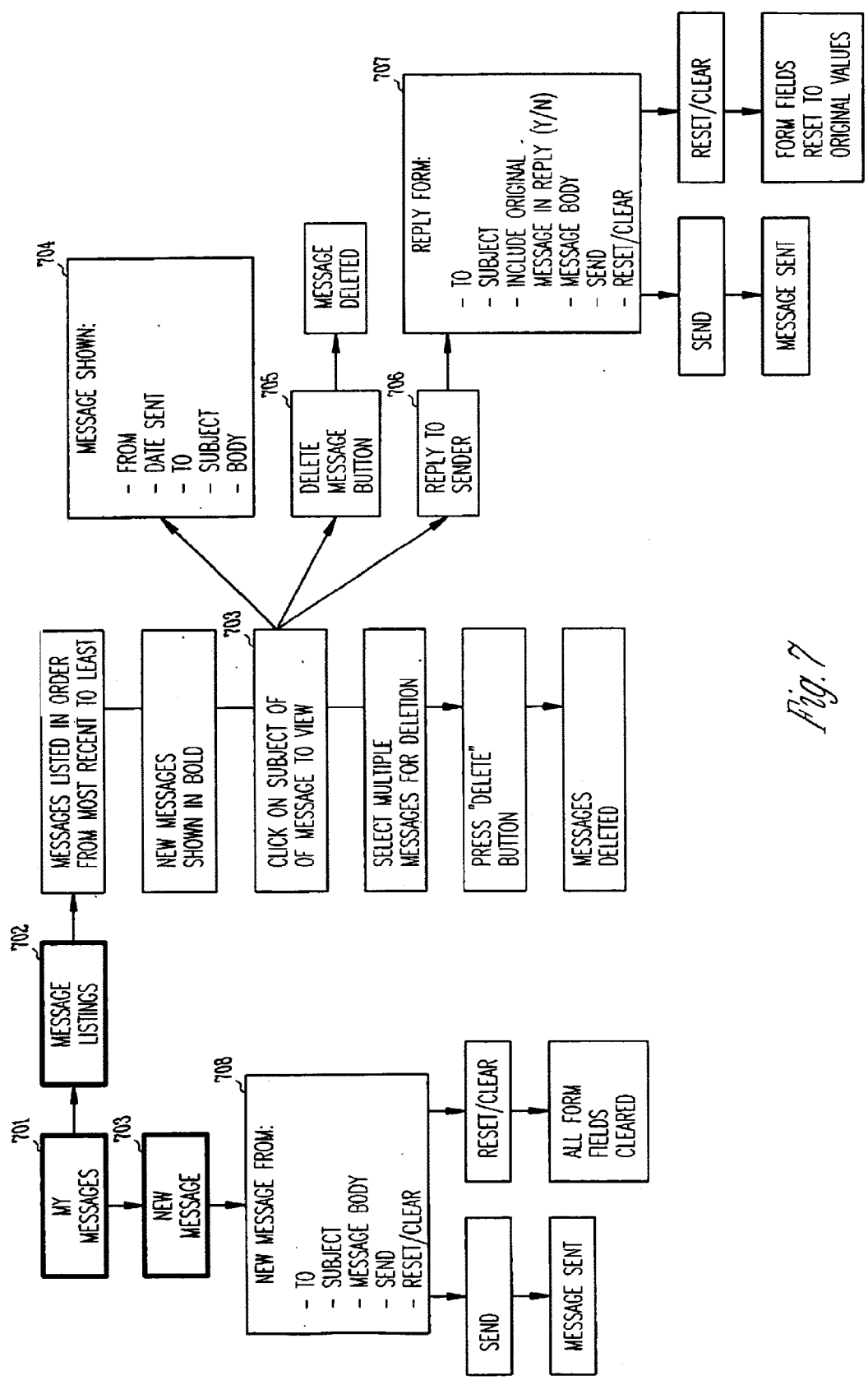
FIG. 7 is a diagram illustrating an internal messaging service which comprises a part of the HTML-eZ example embodiment of the present invention.

Further embodiments of the invention may include a module facilitating discussion, messaging, or chat systems into the website. One example of such a system is illustrated in FIG. 7. A user of the example website selects "my messages" at 701, and is presented with both a listing of the user's received messages at 702 and the ability to create a new message at 703. The messages presented at 702 are ordered from most to least recent, with new messages shown in bold. Messages can be deleted either individually or in groups, but typically will be selected at 703 to view. The message is then displayed at 704, and the user may delete the message at 705 or reply to it at 706. If the user replies, a reply form is generated at 707 which the user uses to create and send the reply.

If the user chooses to create a new message at 703, the user is prompted with a similar form at 708, which typically will include at least subject, message, and recipient or "to" fields. It is anticipated that in various embodiments of the invention the user will be able to send messages not only to other named users, but to groups identified by class, department, course, or course section. Such a feature facilitates discussion of various subjects outside of class, and automatically delivers messages to all users within the selected group.

Other embodiments of the invention may incorporate additional communication features such as a mechanism by which students can submit files other information to instructors. For example, word processing files or other assignments may be submitted and time-stamped upon receipt as a means of collecting homework online. Also, the website creation tool may be configured to create online surveys or quizzes that students take online. Such quizzes may in alternate embodiments be created via auto-conversion of a file in a manner similar to conversion of other non-web content to web content, or may be created via an online tool. The results of the quiz may be displayed to the student as a practice exercise or may be logged and sent to the instructor, and the results of a survey may be distributed to students after completing survey questions. Still other mechanisms are known and are commonly used for communications via the Internet, and are easily adaptable for use with the present invention.

As the above example illustrates, implementations of the invention may include features that facilitate operation of the invention within a specific context, such as an educational environment where class material is provided via the web site pages. The invention in a broader sense provides a system of creating Internet web content, comprising automatic creation of web content from non-web content. In select further embodiments, an organizational database is then updated with information comprising web content structure information associated with the created web content, incorporating the web content into the web page. It is anticipated that the present invention will be adapted to contexts other than educational courses, and these other contexts are within the scope of the invention.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

What is claimed is:

1. A method of creating Internet web content, comprising:
   receiving a stored document comprising non-web content in a web content creation module, the non-web content comprising data in a format that is not a web browser-readable markup language;
   automatically creating web content from the non-web content, the web content comprising web browser-readable markup language data;
   storing the created web content; and
   updating an organizational database, the organizational database comprising web content structural information associated with the created web content, the web content structural information comprising web page structural data for the created web content such that the web presentation structural data is usable to format web page presentation of the created web content.

2. The method of claim 1, wherein receiving a stored document comprising non-web content in a web content creation module comprises loading the stored document comprising non-web content from a specific directory location in storage.

3. The method of claim 1, further comprising automatically detecting the presence of new content provided to the web content creation module by automatically detecting new stored documents comprising non-web data placed in a specific directory location in storage.

4. The method of claim 1, wherein automatically creating web content from the non-web content comprises automatically loading the non-web content into a conversion application and saving it from the conversion application as web content.

5. The method of claim 1, wherein the automatic creation of web content from the non-web content occurs in a server system.

6. The method of claim 1, wherein updating the organizational database to reflect the created web content comprises creating a data record indicating a link between the created web content and other web content.

7. The method of claim 1, wherein updating the organizational database to reflect the created web content comprises updating a data record indicating a link between the created web content and other web content.

8. The method of claim 1, wherein the organizational database further comprises web content ownership and access rights.

9. The method of claim 1, wherein the organizational database further comprises web organizational data records defining website structure and used in rendering website content presentations.

10. The method of claim 9, wherein the defined website structure is rendered in presentation to a user as navigation menus.

11. A machine-readable medium with instructions thereon, the instructions when executed operable to cause a computerized system to perform functions creating Internet web content, comprising:
    receiving a stored document comprising non-web content in a web content creation module, the non-web content comprising data in a format that is not a web browser-readable markup language;
    automatically creating web content from the non-web content, the web content comprising web browser-readable markup language data;
    storing the created web content; and
    updating an organizational database, the organizational database comprising web content structural information associated with the created web content, the web content structural information comprising web page structural data for the created web content such that the web presentation structural data is usable to format web page presentation of the created web content.

12. The machine-readable medium of claim 11, wherein receiving a stored document comprising non-web content in a web content creation module comprises loading the stored document comprising non-web content from a specific directory location in storage.

13. The machine-readable medium of claim 11, the instructions when executed further operable to automatically detect the presence of new content provided to the web content creation module by automatically detecting new stored documents comprising non-web data placed in a specific directory location in storage.

14. The machine-readable medium of claim 11, wherein automatically creating web content from the non-web content comprises automatically loading the non-web content into a conversion application and saving it from the conversion application as web content.

15. The machine-readable medium of claim 11, wherein the automatic creation of web content from the non-web content occurs in a server system.

16. The machine-readable medium of claim 11, wherein updating the organizational database to reflect the created web content comprises creating a data record indicating a link between the created web content and other web content.

17. The machine-readable medium of claim 11, wherein updating the organizational database to reflect the created web content comprises updating a data record indicating a link between the created web content and other web content.

18. The machine-readable medium of claim 11, wherein the organizational database further comprises web content ownership and access rights.

19. The machine-readable medium of claim 11, wherein the organizational database further comprises web organizational data records defining website structure and used in rendering website content presentations.

20. The machine-readable medium of claim 19, wherein the defined website structure is rendered in presentation to a user as navigation menus.

21. An information handling system, the system operable to perform functions comprising:

receiving a stored document comprising non-web content in a web content creation module, the non-web content comprising data in a format that is not a web browser-readable markup language;

automatically creating web content from the non-web content, the web content comprising web browser-readable markup language data;

storing the created web content; and updating an organizational database, the organizational database comprising web content structural information associated with the created web content, the web content structural information comprising web page structural data for the created web content such that the web presentation structural data is usable to format web page presentation of the created web content.

22. The information handling system of claim 21, wherein receiving non-web content in a web content creation module comprises loading the stored document comprising non-web content from a specific directory location in storage.

23. The information handling system of claim 21, the information handling system further operable to perform functions comprising automatically detecting the presence of new content provided to the web content creation module by automatically detecting new data placed in a specific directory location in storage.

24. The information handling system of claim 21, wherein automatically creating web content from the non-web content comprises automatically loading the non-web content into a conversion application and saving it from the conversion application as web content.

25. The information handling system of claim 21, wherein the automatic creation of web content from the non-web content occurs in a server system.

26. The information handling system of claim 21, wherein updating the organizational database to reflect the created web content comprises creating a data record indicating a link between the created web content and other web content.

27. The information handling system of claim 21, wherein updating the organizational database to reflect the created web content comprises updating a data record indicating a link between the created web content and other web content.

28. The information handling system of claim 21, wherein the organizational database further comprises web content ownership and access rights.

29. The information handling system of claim 21, wherein the organizational database further comprises web organizational data records defining website structure and used in rendering website content presentations.

30. The information handling system of claim 29, wherein the defined website structure is rendered in presentation to a user as navigation menus.

31. A method of creating an Internet web page, comprising:

receiving a stored document comprising non-web content in a web content creation module, the non-web content comprising data in a format that is not a web browser-readable markup language;

automatically creating web content from the non-web content, the web content comprising web browser-readable markup language data;

storing the created web content; and incorporating the web content into a web site via an associated web content record in an organizational database comprising web content structural information, the web content structural information comprising web page structural data for the created web content such that the web presentation structural data is usable to format web page presentation of the created web content.

32. A method of creating an Internet web page, comprising:

receiving non-web content in a web content creation module by automatically detecting the presence of the non-web content in a specific directory location in storage, the non-web content comprising data in a format that is not a web browser-readable markup language;

automatically creating web content from the non-web content via a conversion application, the web content comprising web browser-readable markup language data;

storing the created web content; and incorporating the web content into a web site via an associated web content record in an organizational database, the organizational database comprising web organizational data records defining website structure and used in rendering website content presentations.

* * * * *

UNITED STATES PATENT AND TRADEMARK OFFICE
CERTIFICATE OF CORRECTION

PATENT NO. : 6,732,332 B1
DATED : May 4, 2004
INVENTOR(S) : Borysewicz et al.

It is certified that error appears in the above-identified patent and that said Letters Patent is hereby corrected as shown below:

Title page,
Item [56], References Cited, U.S. PATENT DOCUMENTS, after "4,751,740 A" insert -- * --; after "5,608,874 A" insert -- * --; after "5,745,360 A" insert -- * --; after "5,819,302 A" insert -- * --; after 5,845,283 A" insert -- * --; after "5,907,598 A" insert -- * --; after 5,963,966 A" insert -- * --; after "6,032,147 A" insert -- * --; after "6,061,696 A" insert -- * --; "6,115,723 A" insert -- * --; after "6,192,415 B1" insert -- * --; after "6,301,621 B1" insert -- * --; and after "6,401,131 B1" insert -- * --.

Signed and Sealed this

Twenty-seventh Day of July, 2004

JON W. DUDAS
*Acting Director of the United States Patent and Trademark Office*